United States Patent
Li et al.

(10) Patent No.: US 10,574,672 B2
(45) Date of Patent: Feb. 25, 2020

(54) SYSTEM AND METHOD TO DETECT BYPASS OF A SANDBOX APPLICATION

(71) Applicant: McAfee, LLC, Santa Clara, CA (US)

(72) Inventors: Xiaoning Li, Hillsboro, OR (US); Haifei Li, Burnaby (CA); Bing Sun, Santa Clara, CA (US); Lu Deng, Santa Clara, CA (US)

(73) Assignee: McAfee, LLC, Santa Clara, CA (US)

( * ) Notice: Subject to any disclaimer, the term of this patent is extended or adjusted under 35 U.S.C. 154(b) by 497 days.

(21) Appl. No.: 15/200,983

(22) Filed: Jul. 1, 2016

(65) Prior Publication Data
US 2018/0007068 A1  Jan. 4, 2018

(51) Int. Cl.
*H04L 29/06* (2006.01)
*G06F 21/53* (2013.01)

(52) U.S. Cl.
CPC .......... *H04L 63/1416* (2013.01); *G06F 21/53* (2013.01); *H04L 63/1425* (2013.01); *H04L 63/1441* (2013.01)

(58) Field of Classification Search
CPC ............. H04L 63/1416; H04L 63/1425; H04L 63/1441; G06F 21/53
See application file for complete search history.

(56) References Cited

U.S. PATENT DOCUMENTS

| | | |
|---|---|---|
| 5,987,610 A | 11/1999 | Franczek et al. |
| 6,073,142 A | 6/2000 | Geiger et al. |
| 6,460,050 B1 | 10/2002 | Pace et al. |
| 7,506,155 B1 | 3/2009 | Stewart et al. |
| 8,224,796 B1 * | 7/2012 | Shinde ................... G06F 16/162 707/695 |
| 9,390,268 B1 * | 7/2016 | Martini .................. G06F 21/566 |
| 2014/0033304 A1 * | 1/2014 | Lewis ....................... G06F 21/53 726/22 |
| 2014/0215617 A1 * | 7/2014 | Smith .................. H04L 63/1441 726/23 |
| 2015/0074165 A1 * | 3/2015 | Rahardja ................. H04L 67/10 709/201 |
| 2015/0161381 A1 * | 6/2015 | Sun .......................... G06F 21/53 726/22 |
| 2016/0057166 A1 * | 2/2016 | Chesla .................... H04L 63/02 726/23 |
| 2016/0110537 A1 * | 4/2016 | Harrison ................. H04L 67/16 705/14.66 |
| 2017/0083701 A1 * | 3/2017 | Tajalli ................ G06F 17/30424 |
| 2017/0083705 A1 * | 3/2017 | Lee ......................... G06F 21/566 |

(Continued)

*Primary Examiner* — Sarah Su
(74) *Attorney, Agent, or Firm* — Patent Capital Group

(57) ABSTRACT

Particular embodiments described herein provide for an electronic device that can be configured to receive data related to execution of a sandboxed process, determine if a high privileged process was created by the sandboxed process, and block the sandboxed process from executing if the high privileged process was created by the sandboxed process and the data indicates the sandboxed process is attempting a sandbox bypass attack. In an example, the high privileged process was created by the sandboxed process if a resource folder is associated with a sandbox folder. In another example, the high privileged process was created by the sandboxed process if a resource folder was created by a broker process in response to a request by the sandboxed process.

16 Claims, 11 Drawing Sheets

(56) References Cited

U.S. PATENT DOCUMENTS

2017/0193223 A1* 7/2017 Striem-Amit ........... G06F 21/53
2017/0300719 A1* 10/2017 Jungwirth ............... G06F 21/78
2017/0331843 A1* 11/2017 Sandke ............... H04L 63/1416

* cited by examiner

US 10,574,672 B2

1

SYSTEM AND METHOD TO DETECT BYPASS OF A SANDBOX APPLICATION

TECHNICAL FIELD

This disclosure relates in general to the field of information security, and more particularly, to a system and method to detect bypass of a sandbox application.

BACKGROUND

The field of network and cloud security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. One method used to help identify and prevent malware involves use of a sandbox. However, a sandbox can consume significant resources and once the sandbox is breached, the malware can have full control of the system that includes the sandbox.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

2

Figure 8:
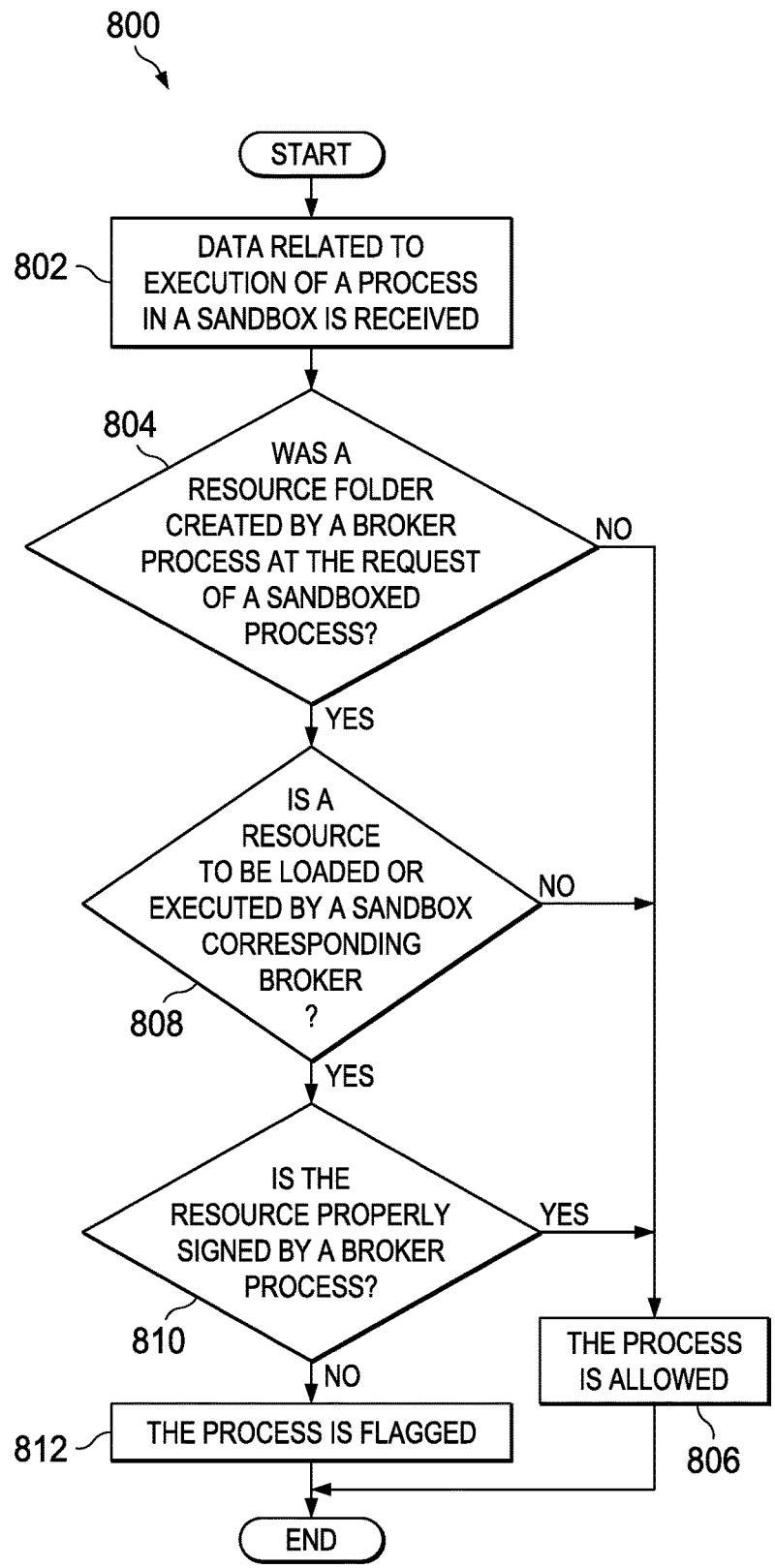
Figure 9:
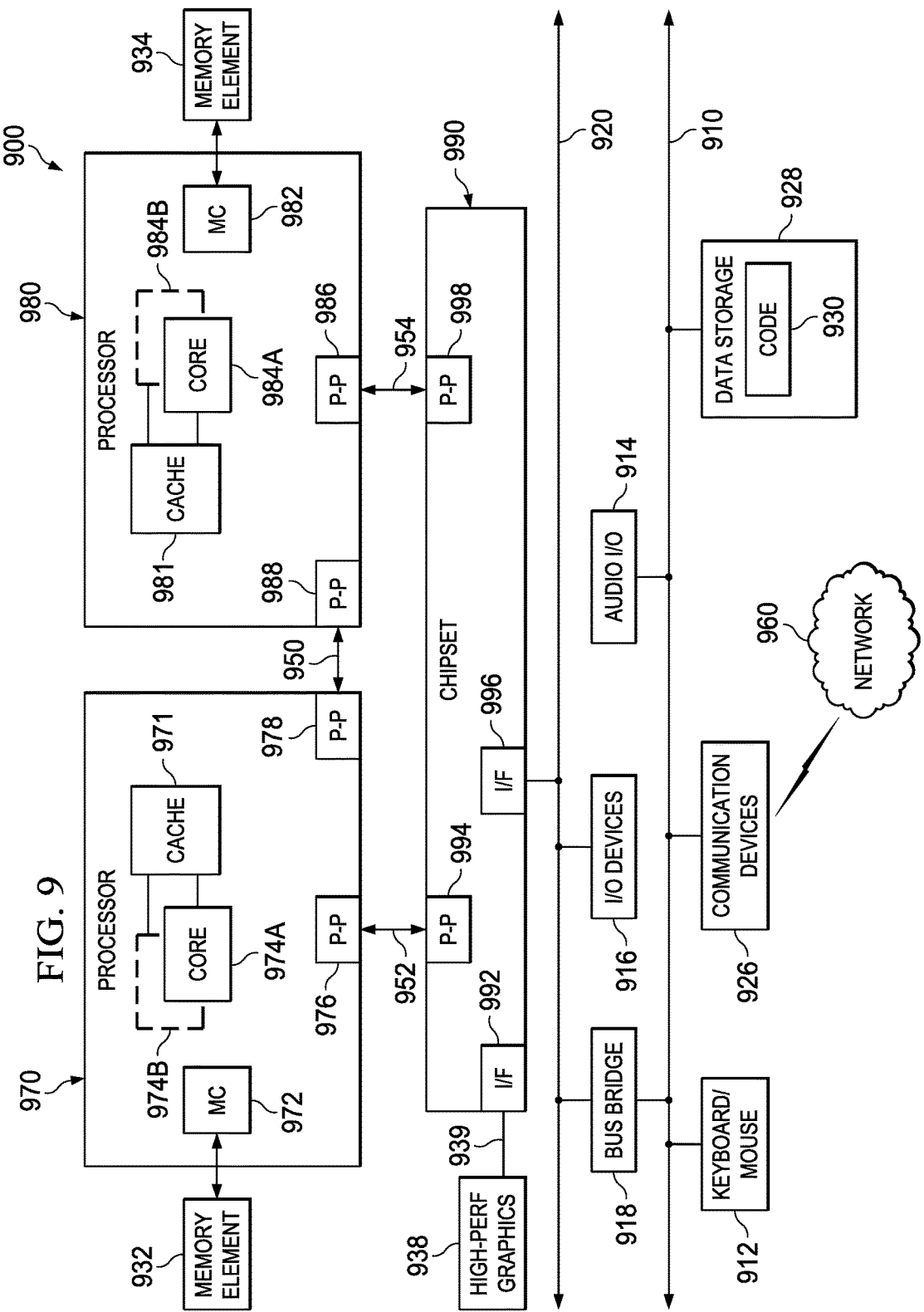
Figure 10:
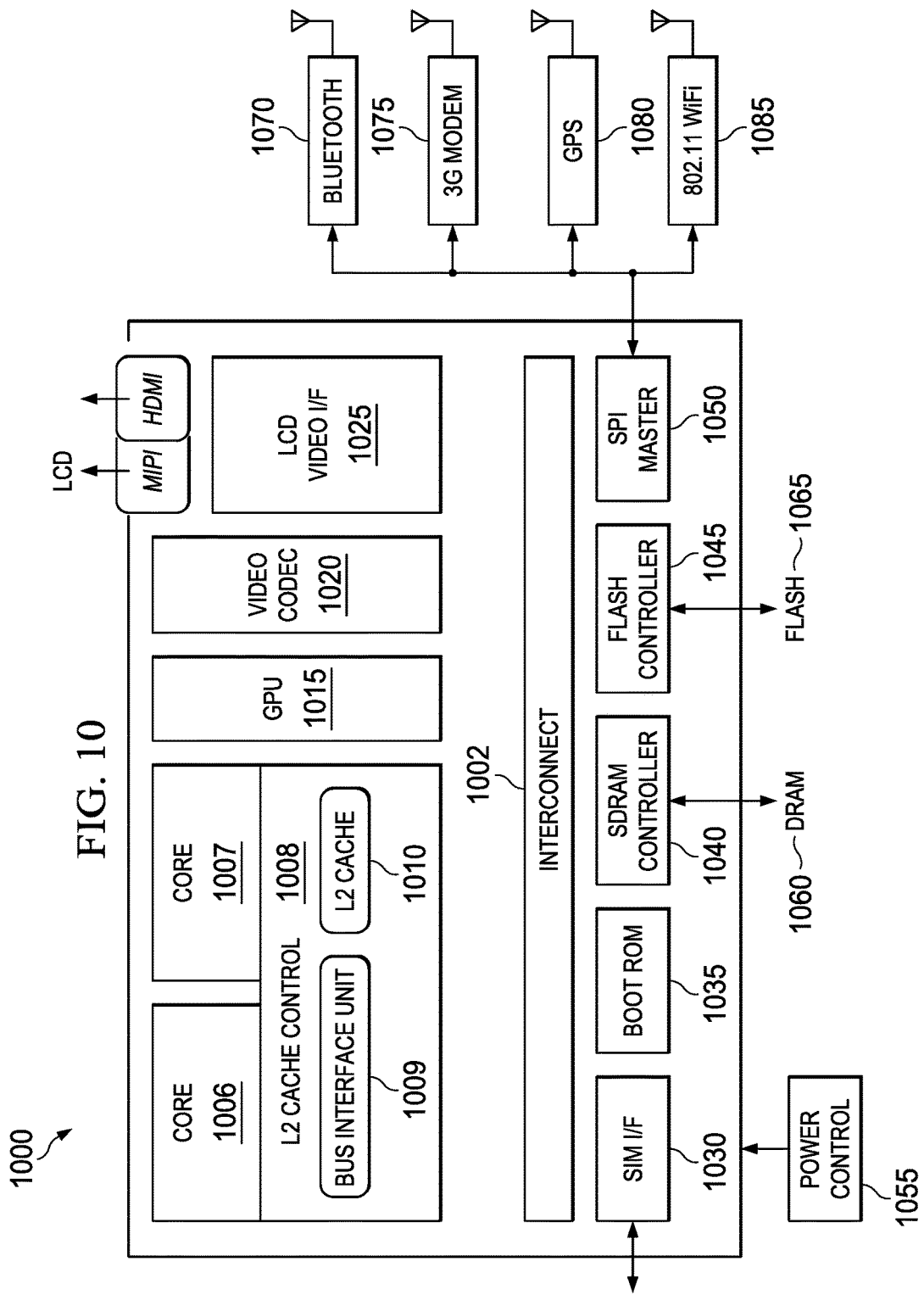
Figure 11:
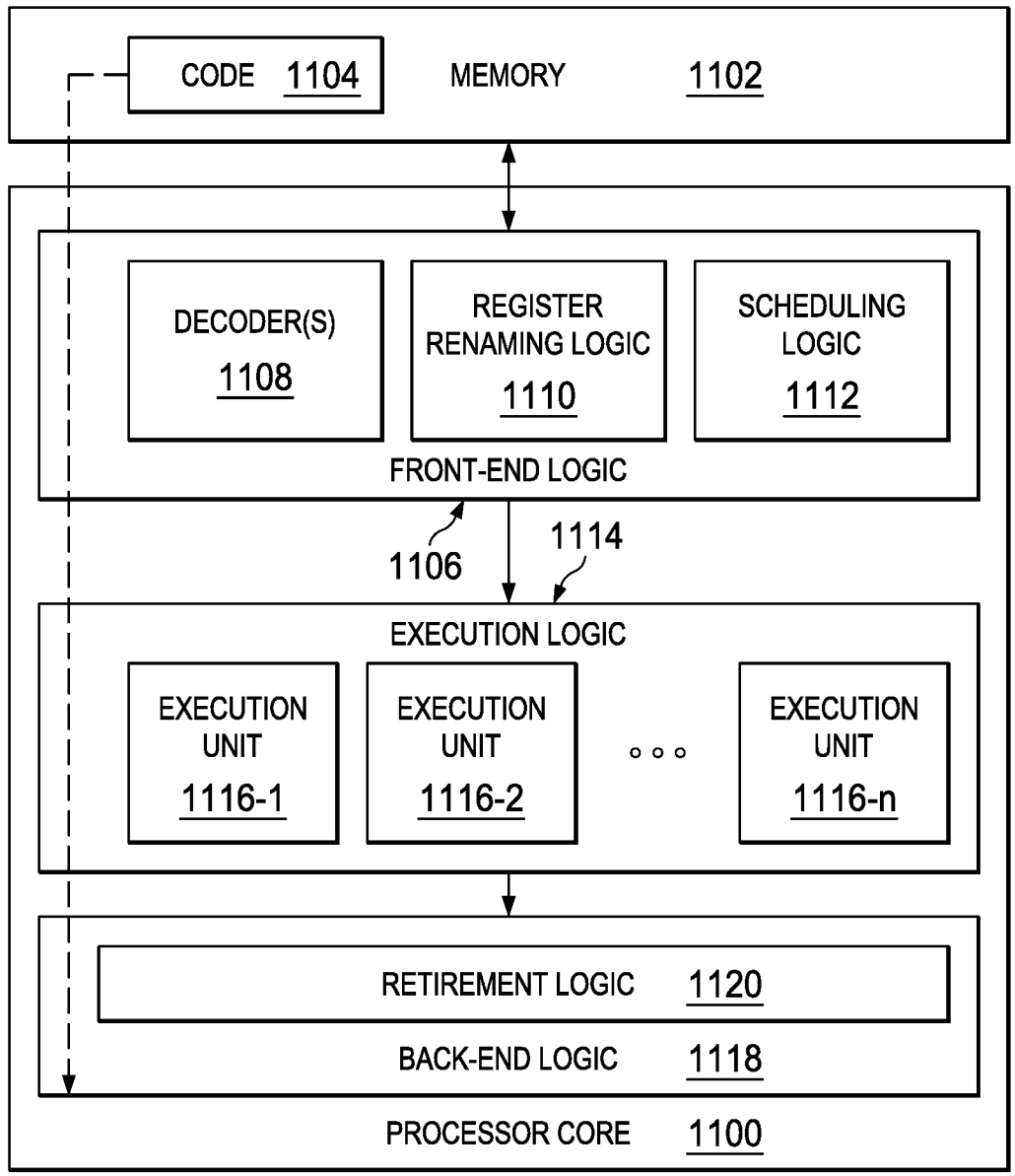

FIG. 8 is a simplified flowchart illustrating potential operations that may be associated with the communication system in accordance with an embodiment;

FIG. 9 is a block diagram illustrating an example computing system that is arranged in a point-to-point configuration in accordance with an embodiment;

FIG. 10 is a simplified block diagram associated with an example system on chip (SOC) of the present disclosure; and FIG. 11 is a block diagram illustrating an example processor core in accordance with an embodiment.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
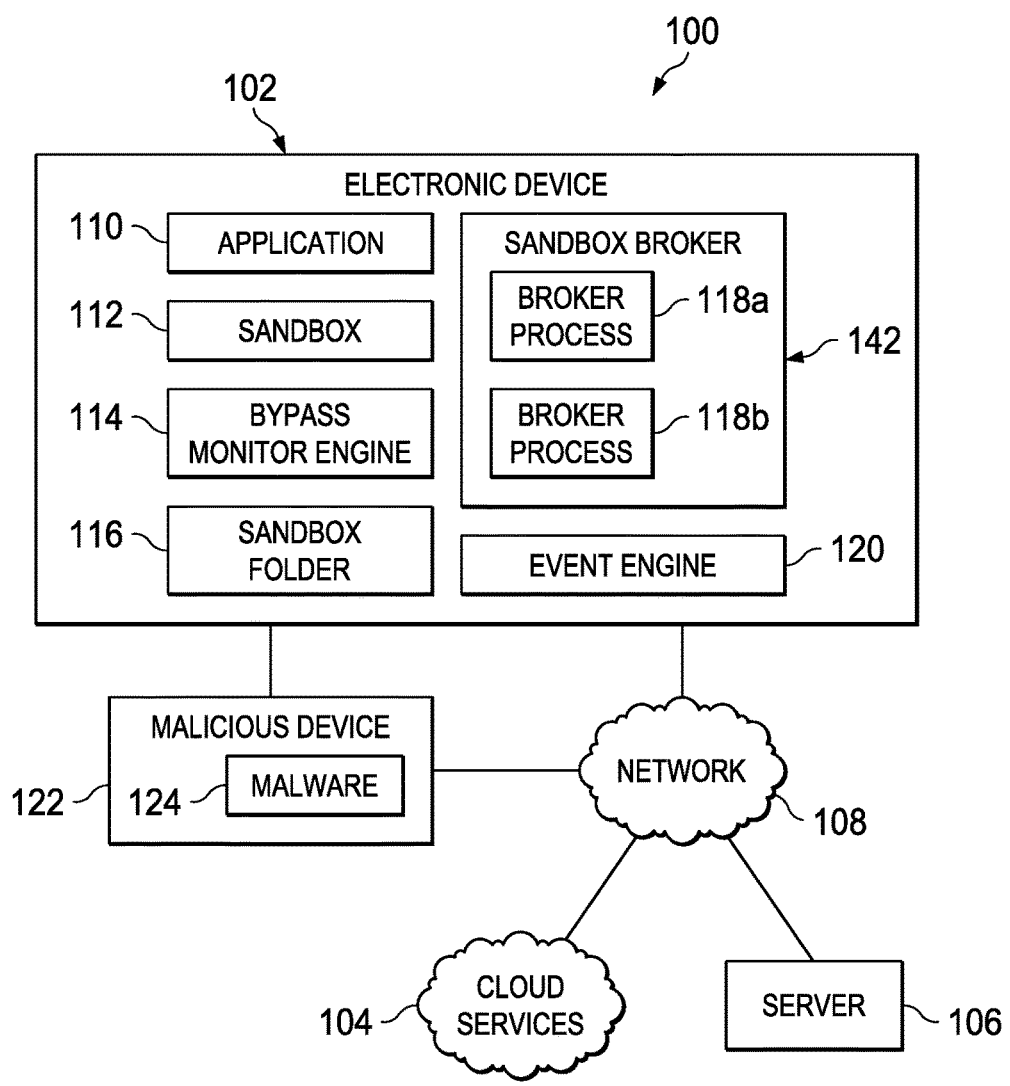
FIG. 1 is a simplified block diagram of a communication system to detect bypass of a sandbox application, in accordance with an embodiment of the present disclosure.

FIG. 1 is a simplified block diagram of a communication system 100 for a system and method to detect bypass of a sandbox application, in accordance with an embodiment of the present disclosure. As illustrated in FIG. 1, communication system 100 can include electronic device 102, cloud services 104, and a server 106. Electronic device 102 can include an application 110, a sandbox 112, a bypass monitor engine 114, a sandbox folder 116, sandbox broker 142, and an event engine 120. Sandbox broker 142 can include one or more broker processes 118*a* and 118*b*. Electronic device 102, cloud services 104, and server 106 may be in communication using a network 108.

In an example, malicious device 122 may attempt to infect electronic device 102 with malware 124. Malware 124 may be communicated to electronic device using a direct connection (e.g., a thumb drive or USB stick) or by using network 108 (e.g., downloaded from a malicious or compromised website). Once in electronic device, malware can try to avoid detection by bypassing sandbox 112.

Elements of FIG. 1 may be coupled to one another through one or more interfaces employing any suitable connections (wired or wireless), which provide viable pathways for network (e.g., network 108, etc.) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

Due to the fact that most popular applications have been found to have critical remote code execution vulnerabilities that allow for full control of a system, many systems have implemented their own built-in sandbox mechanism to mitigate the impact of arbitrary code execution. Typically, the way a system implements a sandbox is to create two separated processes for the protected application. The two separate processes typically include a sandboxed process and a broker process (created by a box broker), which is conformed to the least privilege principle.

The sandboxed process can run at a restricted privilege and can be configured to process untrusted inputs (e.g., webpage rendering, etc.), while the broker process can run at normal application privilege and provide critical functionalities that require higher privilege to sandboxed process through some pre-defined interfaces (such as IPC).

The sandbox mechanism can significantly mitigate the impact of remote code execution attacks as the malicious code is strictly confined in an isolated environment (the sandboxed process) and cannot do further damage to the whole system. With the sandbox in place, it can be very difficult for an attacker to achieve persistent presence on the victim machine. For example, even when a malicious shellcode is successfully running inside an IE sandboxed process (e.g., an Internet Explore tab process), due to lack of privilege, the sandboxed process should not be able to drop/modify files in the system folders and change the system registry key/value.

While the sandbox does have certain advantages, if malware can exist in the sandbox or an exploit can be leveraged to break the sandbox protection, then full control of the system can be obtained by the malware. Typically, for malware to be able to achieve full control of the system, which normally means the ability of regaining control after a reboot, the malware or attacker may use more than one vulnerability to launch a multi-stage exploitation. A multi-stage exploitation usually involves a first remote code execution stage and a second privilege escalation stage. The former gains the initial code execution control, while the latter is used to break sandbox protection. In a typical two-stage exploitation scenario, the first stage remote code execution (RCE) exploit will first create some resources (such as .dll file) either from a sandbox process or a broker process, then the second stage exploit leverages a sandbox bypass vulnerability to force the broker process to load or execute the newly created resource file. What is needed is a system to detect bypass of a sandbox for critical applications.

A communication system to detect bypass of a sandbox for critical applications, as outlined in FIG. 1, can resolve these issues (and others). Communication system 100 may be configured to detect the attempt of breaking the application built-in sandbox mechanism, such as MS IE PM/EPM. It should be noted that the system and method discussed herein are not limited to the examples discussed herein and can be extended to cover other operating system (OS), such as the sandbox of Android and iOS. In terms of the applicability and practicality, the embodiments discussed herein can be adopted by host based IPS products, sandbox based threat analytics systems, or even an OS itself.

In an example, communication system 100 can be configured to detect application sandbox bypass is using a central monitor system (bypass monitor engine 114) to monitor critical executable resource behavior with the understanding that a high privileged process such as a broker process (e.g., broker process 118a) should by no means load or execute any executable resource created/initialized by a low privileged process such as a sandboxed process. For example, a high privileged process should not be created by a sandbox process, by a different broker process, or created by broker interface at the request of sandboxed process. As used herein, the term "sandbox process" and "sandboxed process" include a process that is ran in the sandbox. Violation of this assumption breaks the trust boundary and the privilege separation model of application sandbox designing and is deemed as an attempt of privilege escalation or sandbox bypass.

For example, in one common attack scenario, malware may cause a broker process to execute. More specifically, the broker process loads or executes a malicious executable resource created by a sandboxed process. The resource may be created in a sandboxed folder, which is writable for sandboxed processes. In another common attack scenario, malware may cause a broker process to execute. More specifically, the broker process loads or executes a malicious executable resource created by other broker process at the request of the sandboxed process. The resource will be created in a broker accessible folder, which is writable for other broker processes. In yet another attack scenario, malware may cause a broker process to execute. More specifically, the broker process loads or executes a malicious executable resource created by itself at the request of the sandboxed processes. The resource may be created at a broker accessible folder, which is writable for broker processes.

To help detect each of the above examples, and others, communication system 100 can include a sandbox bypass monitor engine (e.g., bypass monitor engine 114). The sandbox bypass monitor engine can be configured to collect the data from processes being monitored, such as application 110 being processed in sandbox 112 and broker processes 118a and 118b. The system can inject a DLL file including an event engine, resource runtime callback, action engine functions, etc. into the monitored processes. After being injected and activated in the monitored process, an event engine (e.g., event engine 120) can start collecting data such as sandbox process information including process ID, process name, resource creation information including resource folder information, resource creator information, resource requestor information, and resource runtime context information including process ID, process name. Upon each resource load/execution attempt, a resource load/execution runtime callback can be invoked by the sandbox bypass monitor engine as a hook handler. The sandbox bypass monitor engine can then send a query to the event engine for resource runtime context information before the resource may be active.

Based on the process and resource information, the sandbox bypass monitor engine can check against various policies. For example, some of the policies may include if a resource folder that belongs to the sandboxed folder and a resource will be loaded/executed by a corresponding broker, then the action will be considered as a highly possible sandbox bypass attack case. In another example, a resource folder may be created by an irrelevant broker process and the resource will be loaded/executed by a sandbox broker (e.g., sandbox broker 142). Generally, the sandbox broker may be a privileged controller/supervisor of the activities of the sandboxed processes. This may also be considered as a highly possible sandbox bypass attack case. The irrelevant broker process may be a broker process that is not typically associated with the application and therefore, the processes would typically not require the broker process or the folder created by the broker process. In yet another example, a resource folder may be created by a corresponding broker process at the request of a sandboxed process through IPC and the resource will be loaded/executed by a sandbox broker. This too may also be deemed as a highly possible sandbox bypass attack case. In some examples, if the resource was not signed, this could be very likely be an indication of a sandbox bypass attack case. Also, if the resource was signed, but the certificate is not from a broker process vendor, this could also be an indication of a sandbox bypass attack case. However, if the resource was properly signed by a broker process vendor, this could indicate normal usage. After a decision is made that a bypass attack may be occurring, a resource load/execution runtime callback can receive an action request from the sandbox bypass monitor engine and deny, allow (under special exemptions), or log the resource load/execution attempt.

Turning to the infrastructure of FIG. 1, communication system 100 in accordance with an example embodiment is shown. Generally, communication system 100 can be implemented in any type or topology of networks. Network 108 represents a series of points or nodes of interconnected communication paths for receiving and transmitting packets of information that propagate through communication system 100. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 102, cloud services 104, and server 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of electronic device 102, cloud services 104, and server 106 can include memory elements for storing information to be used in the operations outlined herein. Each of electronic device 102, cloud services 104, and server 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic device 102, cloud services 104, and server 106 may include software modules (e.g., bypass monitor engine 114, event engine 120, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 102, cloud services 104, and server 106 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102 can be a network element and includes, for example, desktop computers, laptop computers, mobile devices, personal digital assistants, smartphones, tablets, or other similar devices that include a sandbox or some other similar application or system. Cloud services 104 is configured to provide cloud services to electronic device 102. Cloud services 104 may generally be defined as the use of computing resources that are delivered as a service over a network, such as the Internet. Typically, compute, storage, and network resources are offered in a cloud infrastructure, effectively shifting the workload from a local network to the cloud network. Server 106 can be a network element such as a server or virtual server and can be associated with clients, customers, endpoints, or end users wishing to initiate a communication in communication system 100 via some network (e.g., network 108). The term 'server' is inclusive of devices used to serve the requests of clients and/or perform some computational task on behalf of clients within communication system 100.

Figure 2:
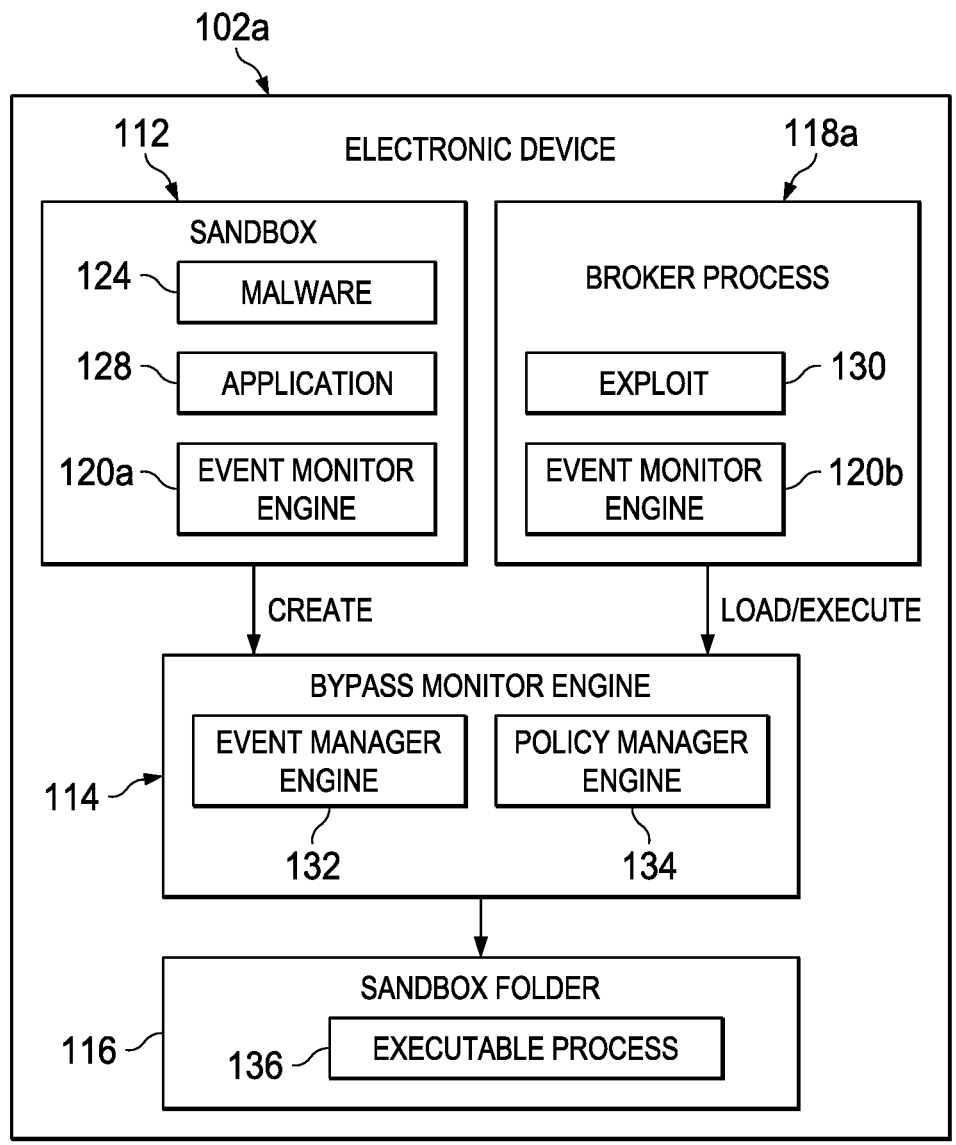
FIG. 2 is a simplified block diagram illustrating an embodiment of a portion of a communication system to detect bypass of a sandbox application, in accordance with one embodiment of the present disclosure.

Turning to FIG. 2, FIG. 2 illustrates a simplified block diagram of a system and method to detect bypass of a sandbox application in accordance with an embodiment of the present disclosure. As illustrated in FIG. 2, electronic device 102b can include sandbox 112, broker process 118a, bypass monitor engine 114, and sandbox folder 116. Sandbox 112 can include malware 124, application 128, and an event monitor engine 120a. Broker process 118a can include exploit 130 and an event monitor engine 120b. Bypass monitor engine 114 can include an event manager engine 132 and a policy manager engine 134.

In an illustrative example, broker process 118a attempts to load or execute exploit 130 (created by malware 124) into sandbox folder 116. Using event monitor engine 132 and policy manager engine 134, bypass monitor engine 114 can detect the attempted bypass of sandbox 112 by malware 124 and prevent the bypass. In another example, benign application 128 can be allowed to create executable process 136 in sandbox folder 116. Benign application 128 may be properly signed by a broker process vendor.

Figure 3:
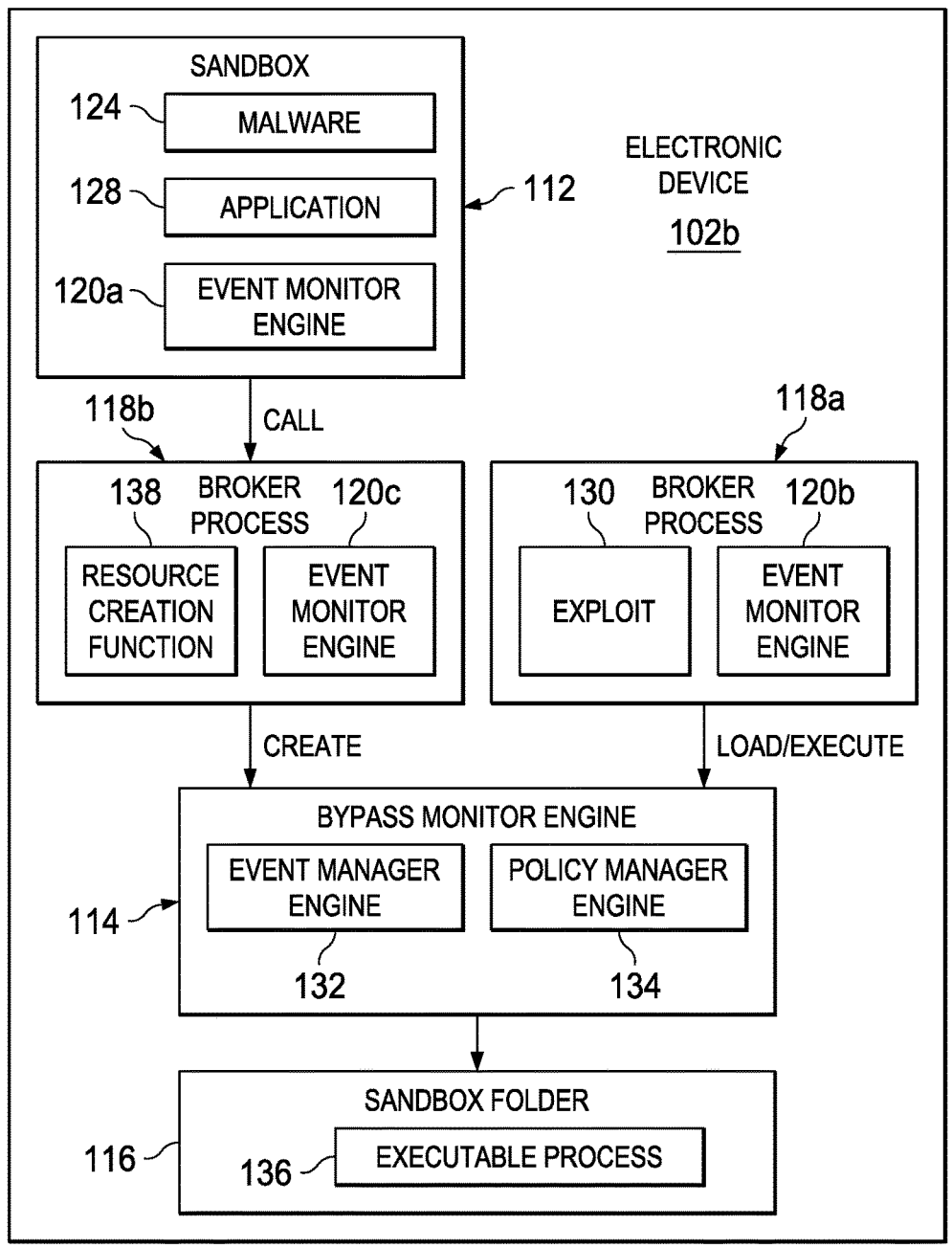
FIG. 3 is a simplified block diagram illustrating an embodiment of a portion of a communication system to detect bypass of a sandbox application, in accordance with one embodiment of the present disclosure.

Turning to FIG. 3, FIG. 3 illustrates a simplified block diagram of a system and method to detect bypass of a sandbox application in accordance with an embodiment of the present disclosure. As illustrated in FIG. 3, electronic device 102b can include sandbox 112, broker process 118b, broker process 118a, bypass monitor engine 114, and sandbox folder 116. Sandbox 112 can include malware 124, application 128, and event monitor engine 120a. Broker process 118b can include a resource creation function 138 and an event monitor engine 120c. Broker process 118a can include exploit 130 and an event monitor engine 120b. Bypass monitor engine 114 can include an event manager engine 132 and a policy manager engine 134.

In an illustrative example, broker process 118a attempts to load or execute exploit 130 (created by malware 124 using broker process 118b) into sandbox folder 116. Using event monitor engine 132 and policy manager engine 134, bypass monitor engine 114 can detect the attempted bypass of sandbox 112 by malware 124 and prevent the bypass. In another example, benign application 128 can be allowed to create executable process 136 in sandbox folder 116.

Figure 4:
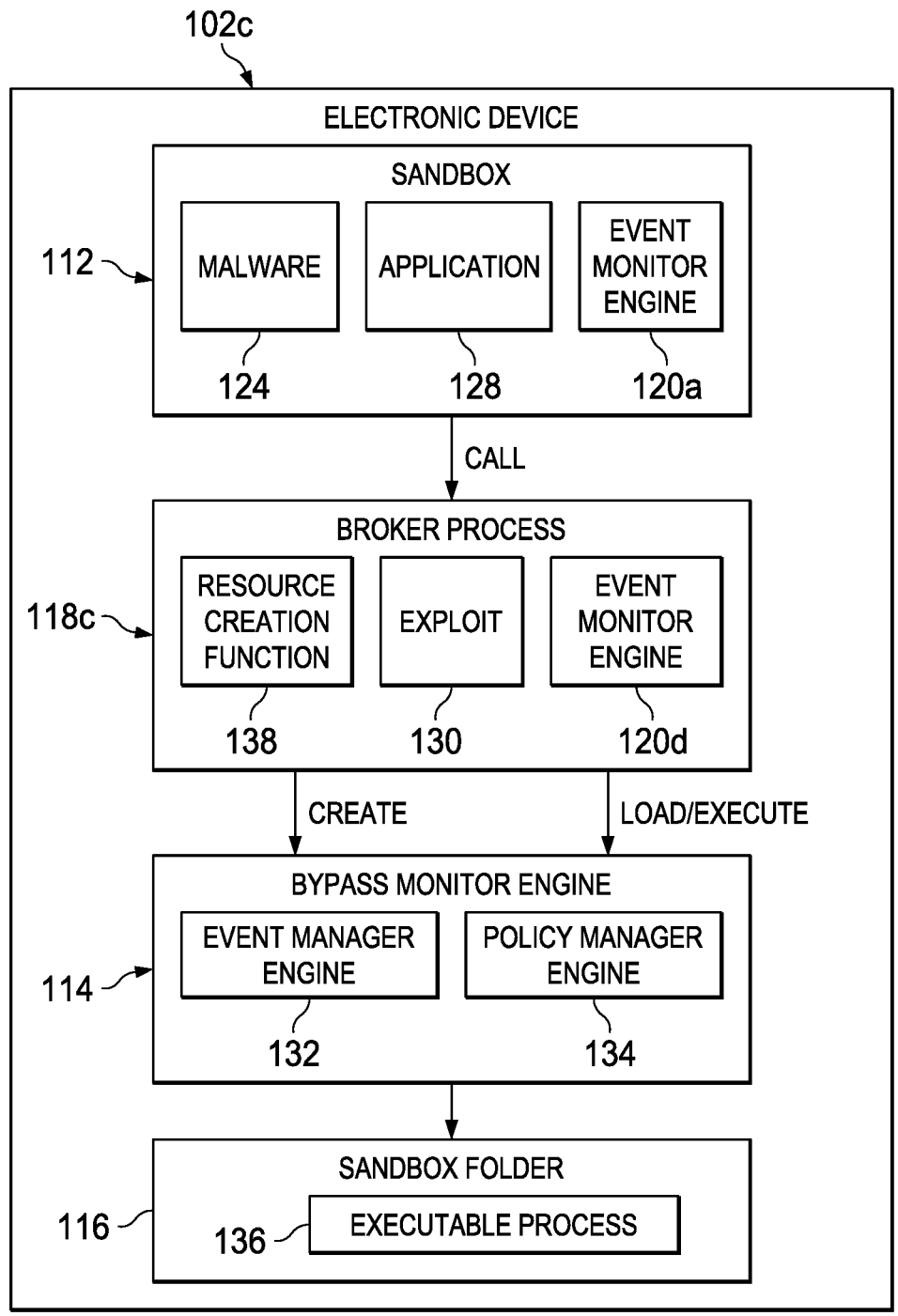
FIG. 4 is a simplified block diagram illustrating an embodiment of a portion of a communication system to detect bypass of a sandbox application, in accordance with one embodiment of the present disclosure.

Turning to FIG. 4, FIG. 4 illustrates a simplified block diagram of a system and method to detect bypass of a sandbox application in accordance with an embodiment of the present disclosure. As illustrated in FIG. 4, electronic device 102c can include sandbox 112, a broker process 118c, bypass monitor engine 114, and sandbox folder 116. Sandbox 112 can include malware 124, application 128, and event monitor engine 120a. Broker process 118c can include resource creation function 138, an event monitor engine 120d, and exploit 130. Bypass monitor engine 114 can include an event manager engine 132 and a policy manager engine 134.

In an illustrative example, broker process 118a attempts to load or execute exploit 130 (created by itself at the request of malware 124) into sandbox folder 116. Using event monitor engine 132 and policy manager engine 134, bypass monitor engine 114 can detect the attempted bypass of sandbox 112 by malware 124 and prevent the bypass. In another example, benign application 128 can be allowed to create executable process 136 in sandbox folder 116.

Figure 5:
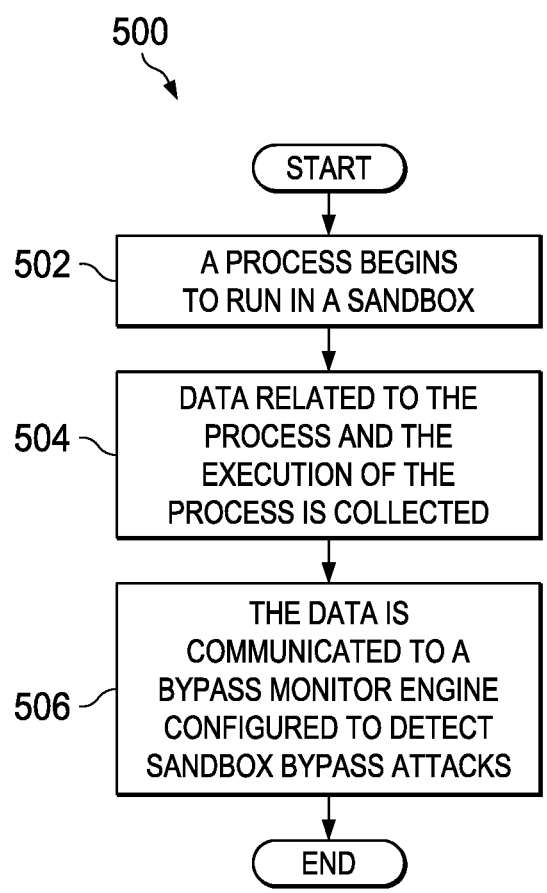
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with a system and method to detect bypass of a sandbox application, in accordance with an embodiment. In an embodiment, one or more operations of flow 500 may be performed by bypass monitor engine 114, event monitor engines 120a-120d, event manager engine 132, and policy manager engine 134. At 502, a process begins to run in a sandbox. At 504, data related to the process and the execution of the process is collected. At 506, the data is communicated to a bypass monitor engine configured to detect sandbox bypass attacks. For example, the data may be used to determine if a high privileged process was created by a sandbox process and the process is attempting a sandbox bypass attack. In some examples, the data may indicate that the process is not attempting a sandbox bypass attack. For example, they system may determine that a high privileged process was created by the sandboxed process if a resource is to be loaded or executed by a sandbox broker, which would indicate a sandbox bypass attack, however, if the resource is properly signed, then resource to be loaded or executed by the sandbox broker is not a sandbox attack but a legitimate process.

Figure 6:
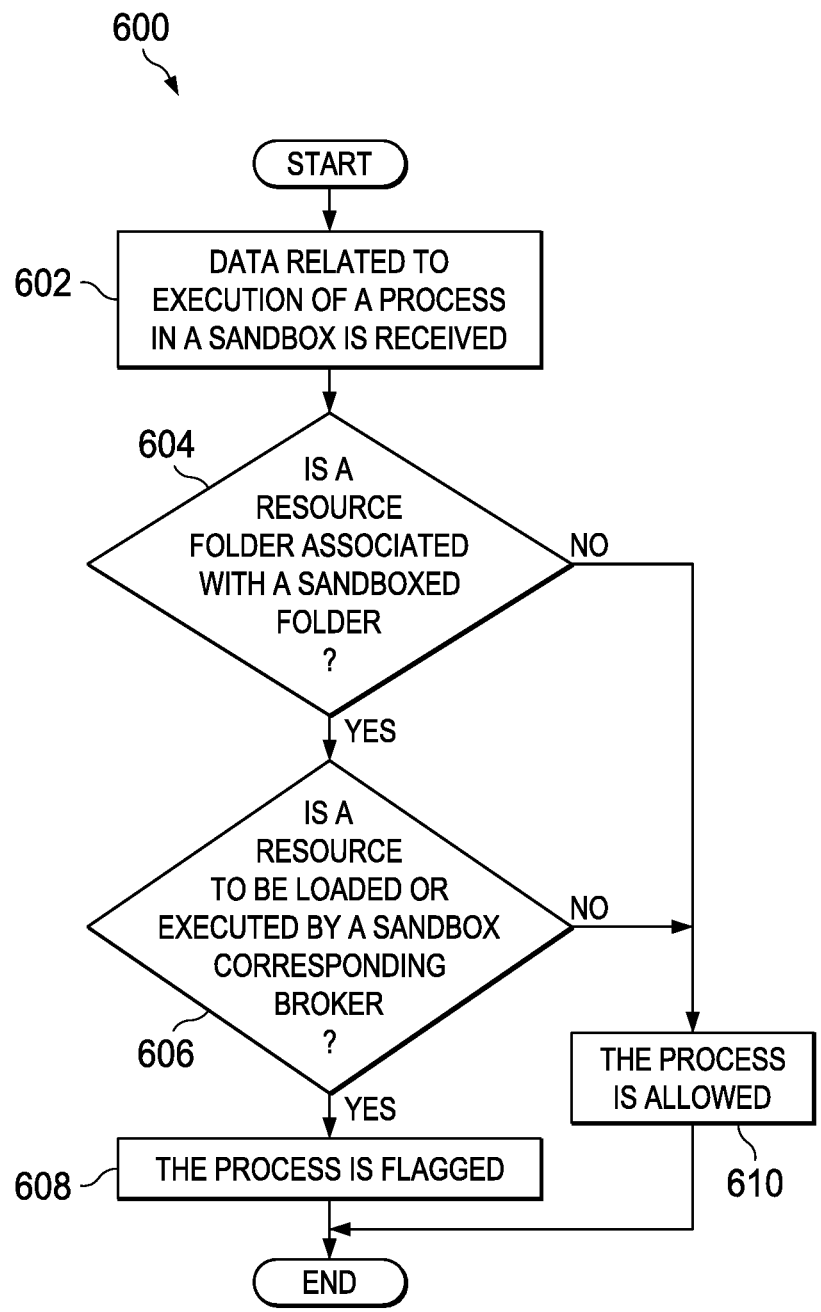
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with a system and method to detect bypass of a sandbox application, in accordance with an embodiment. In an embodiment, one or more operations of flow 600 may be performed by bypass monitor engine 114, event monitor engines 120a-120d, event manager engine 132, and policy manager engine 134. At 602, data related to execution of a process in a sandbox is received. At 604, the system determines if a resources folder is associated with a sandboxed folder. If the system determines that a resource folder is not associated with a sandboxed folder, then the process is allowed, as in 610. If the system determines that a resources folder is associated with a sandboxed folder, then the system determines if a resource is to be loaded or executed by a sandbox broker, as in 606. If the resource is not to be loaded or executed by a sandbox broker, then the process is allowed, as in 610. If the resource is to be loaded or executed by a sandbox broker, then the process is flagged as possibly trying to bypass the sandbox application, as in 608.

Figure 7:
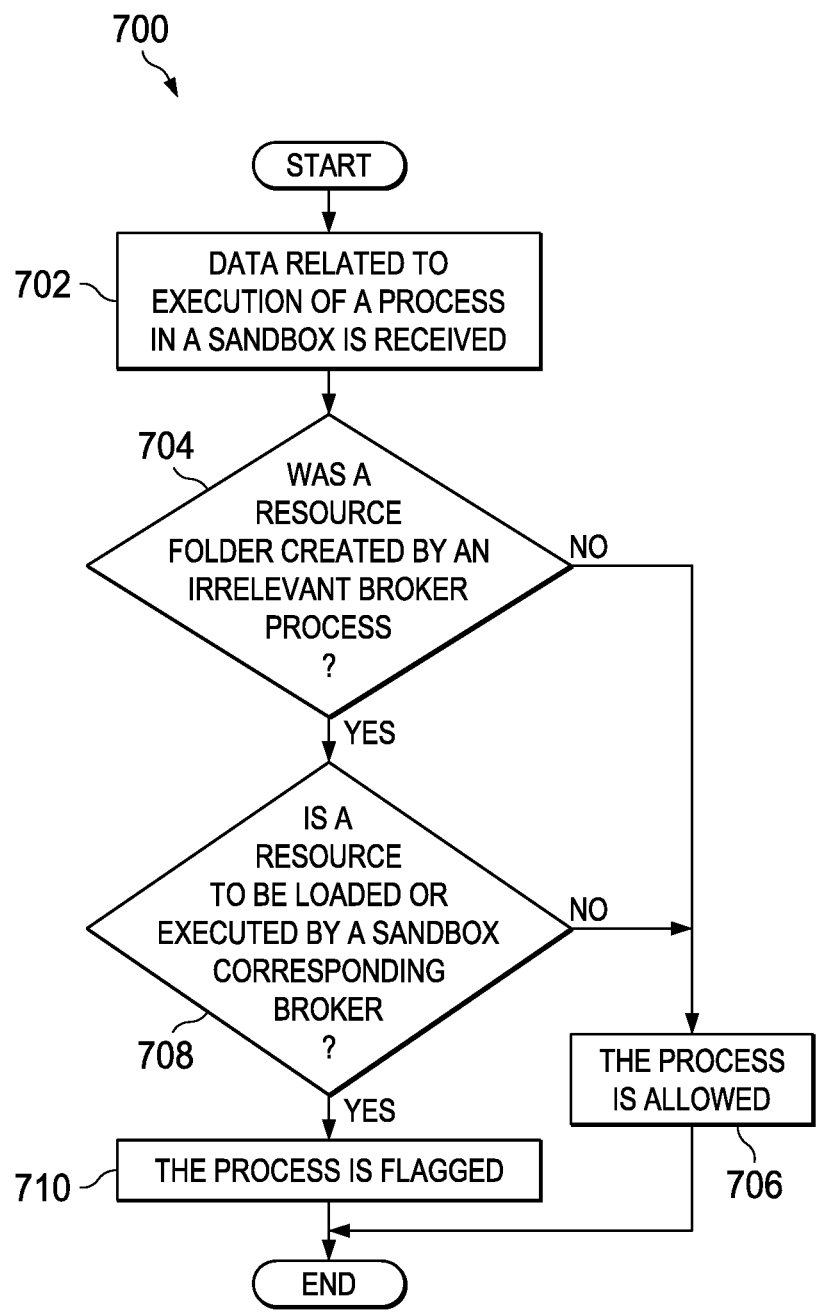
FIG. 7 is a simplified flowchart illustrating potential operations that may be associated with the communication system in accordance with an embodiment.

Turning to FIG. 7, FIG. 7 is an example flowchart illustrating possible operations of a flow 700 that may be associated with a system and method to detect bypass of a sandbox application, in accordance with an embodiment. In an embodiment, one or more operations of flow 700 may be performed by bypass monitor engine 114, event monitor engines 120a-120d, event manager engine 132, and policy manager engine 134. At 702, data related to execution of a process in a sandbox is received. At 704, the system determines if a resource folder was created by an irrelevant broker process. If the system determines that a resource folder was not created by an irrelevant broker process, then the process is allowed, as in 706. If the system determines that a resource folder was created by an irrelevant broker process, then the system determines if a resource is to be loaded or executed by a sandbox broker, as in 708. If the resource is not to be loaded or executed by a sandbox broker, then the process is allowed, as in 706. If the resource is to be loaded or executed by a sandbox broker, then the process is flagged as possibly trying to bypass the sandbox application, as in 710.

Turning to FIG. 8, FIG. 8 is an example flowchart illustrating possible operations of a flow 800 that may be associated with a system and method to detect bypass of a sandbox application, in accordance with an embodiment. In an embodiment, one or more operations of flow 800 may be performed by bypass monitor engine 114, event monitor engines 120a-120d, event manager engine 132, and policy manager engine 134. At 802, data related to execution of a process in a sandbox is received. At 804, the system determines if a resource folder was created by a broker process at the request of a sandboxed process. If a resources folder was not created by a broker process at the request of a sandboxed process, then the process is allowed, as in 806. If a resource folder was created by a broker process at the request of a sandboxed process, then the system determines if a resource is to be loaded or executed by a sandbox broker. If a resource is not to be loaded or executed by a sandbox broker, then the process is allowed, as in 806. If a resource is to be loaded or executed by a sandbox broker, then the system determines if the resource is properly signed by a broker process, as in 810. If the resource is properly signed by a broker process, then the process is allowed, as in 806. If the resource is not properly signed by a broker process, then the process is flagged as possibly trying to bypass the sandbox application, as in 812.

Turning to FIG. 9, FIG. 9 illustrates a computing system 900 that is arranged in a point-to-point (PtP) configuration according to an embodiment. In particular, FIG. 9 shows a system where processors, memory, and input/output devices are interconnected by a number of point-to-point interfaces. Generally, one or more of the network elements of communication system 100 may be configured in the same or similar manner as computing system 900.

As illustrated in FIG. 9, system 900 may include several processors, of which only two, processors 970 and 980, are shown for clarity. While two processors 970 and 980 are shown, it is to be understood that an embodiment of system 900 may also include only one such processor. Processors 970 and 980 may each include a set of cores (i.e., processor cores 974A and 974B and processor cores 984A and 984B) to execute multiple threads of a program. The cores may be configured to execute instruction code in a manner similar to that discussed above with reference to FIGS. 6-9. Each processor 970, 980 may include at least one shared cache 971, 981. Shared caches 971, 981 may store data (e.g., instructions) that are utilized by one or more components of processors 970, 980, such as processor cores 974A and 984A.

Processors 970 and 980 may also each include integrated memory controller logic (MC) 972 and 982 to communicate with memory elements 932 and 934. Memory elements 932 and/or 934 may store various data used by processors 970 and 980. In alternative embodiments, memory controller logic 972 and 982 may be discrete logic separate from processors 970 and 980.

Processors 970 and 980 may be any type of processor and may exchange data via a point-to-point (PtP) interface 950 using point-to-point interface circuits 978 and 988, respectively. Processors 970 and 980 may each exchange data with a chipset 990 via individual point-to-point interfaces 952 and 954 using point-to-point interface circuits 976, 986, 994, and 998. Chipset 990 may also exchange data with a high-performance graphics circuit 938 via a high-performance graphics interface 939, using an interface circuit 992, which could be a PtP interface circuit. In alternative embodiments, any or all of the PtP links illustrated in FIG. 9 could be implemented as a multi-drop bus rather than a PtP link.

Chipset 990 may be in communication with a bus 920 via an interface circuit 996. Bus 920 may have one or more devices that communicate over it, such as a bus bridge 918 and I/O devices 916. Via a bus 910, bus bridge 918 may be in communication with other devices such as a keyboard/mouse 912 (or other input devices such as a touch screen, trackball, etc.), communication devices 926 (such as modems, network interface devices, or other types of communication devices that may communicate through a computer network 960), audio I/O devices 914, and/or a data storage device 928. Data storage device 928 may store code 930, which may be executed by processors 970 and/or 980. In alternative embodiments, any portions of the bus architectures could be implemented with one or more PtP links.

The computer system depicted in FIG. 9 is a schematic illustration of an embodiment of a computing system that may be utilized to implement various embodiments discussed herein. It will be appreciated that various components of the system depicted in FIG. 9 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Turning to FIG. 10, FIG. 10 is a simplified block diagram associated with an example SOC 1000 of the present disclosure. At least one example implementation of the present disclosure can include the security service for an unmanaged device features discussed herein. Further, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc.

In this example of FIG. 10, SOC 1000 may include multiple cores 1006-1007, an L2 cache control 1008, a bus interface unit 1009, an L2 cache 1010, a graphics processing unit (GPU) 1015, an interconnect 1002, a video codec 1020, and a liquid crystal display (LCD) I/F 1025, which may be associated with mobile industry processor interface (MIPI)/high-definition multimedia interface (HDMI) links that couple to an LCD.

SOC 1000 may also include a subscriber identity module (SIM) I/F 1030, a boot read-only memory (ROM) 1035, a synchronous dynamic random access memory (SDRAM) controller 1040, a flash controller 1045, a serial peripheral interface (SPI) master 1050, a suitable power control 1055, a dynamic RAM (DRAM) 1060, and flash 1065. In addition, one or more example embodiment include one or more communication capabilities, interfaces, and features such as instances of Bluetooth™ 1070, a 3G modem 1075, a global positioning system (GPS) 1080, and an 802.11 Wi-Fi 1085.

In operation, the example of FIG. 10 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe™ Flash™ Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Turning to FIG. 11, FIG. 11 illustrates a processor core 1100 according to an embodiment. Processor core 1100 may be the core for any type of processor, such as a microprocessor, an embedded processor, a digital signal processor (DSP), a network processor, or other device to execute code. Although only one processor core 1100 is illustrated in FIG. 11, a processor may alternatively include more than one of the processor core 1100 illustrated in FIG. 11. For example, processor core 1100 represents one example embodiment of processors cores 974a, 974b, 984a, and 984b shown and described with reference to processors 970 and 980 of FIG. 9. Processor core 1100 may be a single-threaded core or, for at least one embodiment, processor core 1100 may be multithreaded in that it may include more than one hardware thread context (or "logical processor") per core.

FIG. 11 also illustrates a memory 1102 coupled to processor core 1100 in accordance with an embodiment. Memory 1102 may be any of a wide variety of memories (including various layers of memory hierarchy) as are known or otherwise available to those of skill in the art. Memory 1102 may include code 1104, which may be one or more instructions, to be executed by processor core 1100. Processor core 1100 can follow a program sequence of instructions indicated by code 1104. Each instruction enters a front-end logic 1106 and is processed by one or more decoders 1108. The decoder may generate, as its output, a micro operation such as a fixed width micro operation in a predefined format, or may generate other instructions, microinstructions, or control signals that reflect the original code instruction. Front-end logic 1106 also includes register renaming logic 1110 and scheduling logic 1112, which generally allocate resources and queue the operation corresponding to the instruction for execution.

Processor core 1100 can also include execution logic 1114 having a set of execution units 1116-1 through 1116-N. Some embodiments may include a number of execution units dedicated to specific functions or sets of functions. Other embodiments may include only one execution unit or one execution unit that can perform a particular function. Execution logic 1114 performs the operations specified by code instructions.

After completion of execution of the operations specified by the code instructions, back-end logic 1118 can retire the instructions of code 1104. In one embodiment, processor core 1100 allows out of order execution but requires in order retirement of instructions. Retirement logic 1120 may take a variety of known forms (e.g., re-order buffers or the like). In this manner, processor core 1100 is transformed during execution of code 1104, at least in terms of the output generated by the decoder, hardware registers and tables utilized by register renaming logic 1110, and any registers (not shown) modified by execution logic 1114.

Although not illustrated in FIG. 11, a processor may include other elements on a chip with processor core 1100, at least some of which were shown and described herein with reference to FIG. 9. For example, as shown in FIG. 9, a processor may include memory control logic along with processor core 1100. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 5-8) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable storage medium having one or more instructions that when executed by at least one processor, cause the at least one processor to receive data related to execution of a process in a sandbox, determine if a high privileged process was created by a sandbox process, block the application from executing if the high privileged process was created by a sandbox process and the data indicates the process is attempting a sandbox bypass attack.

In Example C2, the subject matter of Example C1 can optionally include where determining if a high privileged process was created by a sandbox process including determining if a resource folder is associated with a sandbox folder.

In Example C3, the subject matter of any one of Examples C1-C2 can optionally include where determining if a high privileged process was created by a sandbox process including determining if a resource folder was created by an irrelevant broker process.

In Example C4, the subject matter of any one of Examples C1-C3 can optionally include where determining if a high privileged process was created by a sandbox process including determining if a resource folder was created by a broker process at the request of a sandboxed process.

In Example C5, the subject matter of any one of Examples C1-C4 can optionally include where determining if a high privileged process was created by a sandbox process including determining if a resources is to be loaded or executed by a sandbox broker.

In Example C6, the subject matter of any one of Example C1-05 can optionally include where the instructions, when executed by the by at least one processor, further cause the at least one processor to allow the process if the resource is properly signed.

In Example A1, an apparatus can include a bypass monitor engine configured to receive data related to execution of a process in a sandbox, determine if a high privileged process was created by a sandbox process and block the application from executing if the high privileged process was created by a sandbox process and the data indicates the process is attempting a sandbox bypass attack.

In Example, A2, the subject matter of Example A1 can optionally include where the high privileged process was created by a sandbox process if a resource folder is associated with a sandbox folder.

In Example A3, the subject matter of any one of Examples A1-A2 can optionally include where the high privileged process was created by a sandbox process if a resource folder was created by an irrelevant broker process.

In Example A4, the subject matter of any one of Examples A1-A3 can optionally include where the high privileged process was created by a sandbox process if a resource folder was created by a broker process at the request of a sandboxed process.

In Example A5, the subject matter of any one of Examples A1-A4 can optionally include where the high privileged process was created by a sandbox process if a resource is to be loaded or executed by a sandbox broker.

In Example A6, the subject matter of any one of Examples A1-A5 can optionally include where the network services platform is further configured to allow the process if the resource is properly signed.

Example M1 is a method including receiving data related to execution of a process in a sandbox, determining if a high privileged process was created by a sandbox process, and blocking the application from executing if the high privileged process was created by a sandbox process and the data indicates the process is attempting a sandbox bypass attack.

In Example M2, the subject matter of Example M1 can optionally include determining that the high privileged process was created by a sandbox process if a resource folder is associated with a sandbox folder.

In Example M3, the subject matter of any one of the Examples M1-M2 can optionally further include determining that the high privileged process was created by a sandbox process if a resource folder was created by an irrelevant broker process.

In Example M4, the subject matter of any one of the Examples M1-M3 can optionally further include determining that the high privileged process was created by a sandbox process if a resource folder was created by a broker process at the request of a sandboxed process.

In Example M5, the subject matter of any one of the Examples M1-M4 can optionally further include determining that the high privileged process was created by a sandbox process if a resources is to be loaded or executed by a sandbox broker.

Example S1 is a system for detecting bypass of a sandbox, the system comprising a bypass monitor engine configured to receive data related to execution of a process in a sandbox, determine if a high privileged process was created by a sandbox process, and block the application from executing if the high privileged process was created by a sandbox process and the data indicates the process is attempting a sandbox bypass attack.

In Example S2, the subject matter of Example S1 can optionally include where the high privileged process was created by a sandbox process if a resource folder is associated with a sandbox folder.

In Example S3, the subject matter of any one of the Examples S1-S2 can optionally include where the high privileged process was created by a sandbox process if a resource folder was created by a broker process at the request of a sandboxed process.

Example X1 is a machine-readable storage medium including machine-readable instructions to implement a method or realize an apparatus as in any one of the Examples A1-A6, or M1-M5. Example Y1 is an apparatus comprising means for performing of any of the Example methods M1-M5. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that when executed by at least one processor, cause the at least one processor to:
   receive data related to execution of a sandboxed process;
   determine whether a high privileged process was created by the sandboxed process, wherein the high privileged process was created by the sandboxed process if a resource folder is directly linked with a sandbox folder;
   determine whether the data indicates the sandboxed process is attempting a sandbox bypass attack; and
   block the sandboxed process from executing based on a determination that the high privileged process was created by the sandboxed process and based on a determination that the data indicates the sandboxed process is attempting the sandbox bypass attack.

2. The at least one non-transitory machine readable medium of claim 1, wherein the high privileged process was created by the sandboxed process if the resource folder was created by an irrelevant broker process.

3. The at least one non-transitory machine readable medium of claim 1, wherein the high privileged process was created by the sandboxed process if the resource folder was created by a broker process in response to a request by the sandboxed process.

4. The at least one non-transitory machine readable medium of claim 1, further comprising one or more instructions that when executed by the at least one processor, further cause the at least one processor to: determine if the resource folder includes a resource to be loaded or executed by a sandbox broker.

5. The at least one non-transitory machine readable medium of claim 1, further comprising one or more instructions that when executed by the at least one processor, further cause the at least one processor to: allow the sandboxed process if the resource is properly signed.

6. An apparatus comprising:
a bypass monitor engine, having a hardware processor, configured to:
receive data related to execution of a sandboxed process;
determine whether a high privileged process was created by the sandboxed process, wherein the high privileged process was created by the sandboxed process if a resource folder is directly linked with a sandbox folder;
determine whether the data indicates the sandboxed process is attempting a sandbox bypass attack; and
block the sandboxed process from executing based on a determination that the high privileged process was created by the sandboxed process and based on a determination that the data indicates the sandboxed process is attempting the sandbox bypass attack.

7. The apparatus of claim 6, wherein the high privileged process was created by the sandboxed process if the resource folder was created by an irrelevant broker process.

8. The apparatus of claim 6, wherein the high privileged process was created by the sandboxed process if the resource folder was created by a broker process in response to a request by the sandboxed process.

9. The apparatus of claim 6, wherein the bypass monitor engine is further configured to:
determine if the resource folder includes a resource to be loaded or executed by a sandbox broker.

10. The apparatus of claim 9, wherein the bypass monitor engine is further configured to:
allow the sandboxed process if the resource is properly signed.

11. A method comprising:
receiving data related to execution of a sandboxed process;
determining if a resource folder is associated with a sandbox folder;
determining, based on a determination that the resource folder is directly linked with the sandbox folder, that a high privileged process was created by the sandboxed process;
determining whether the data indicates the sandboxed process is attempting a sandbox bypass attack; and
blocking the sandboxed process from executing based on a determination that the high privileged process was created by the sandboxed process and based on a determination that the data indicates the sandboxed process is attempting a sandbox bypass attack.

12. The method of claim 11, further comprising:
determining if the resource folder was created by an irrelevant broker process.

13. The method of claim 11, further comprising:
determining if the resource folder was created by a broker process in response to a request by the sandboxed process.

14. The method of claim 11, further comprising:
determining if the resource folder includes a resource to be loaded or executed by a sandbox broker.

15. A system for detecting bypass of a sandbox, the system comprising:
a bypass monitor engine, having a hardware processor, configured to:
receive data related to execution of a sandboxed process;
determine whether a high privileged process was created by the sandboxed process, wherein the high privileged process was created by the sandboxed process if a resource folder is directly linked with a sandbox folder;
determine whether the data indicates the sandboxed process is attempting a sandbox bypass attack; and
block the sandboxed process from executing based on a determination that the high privileged process was created by the sandboxed process and based on a determination that the data indicates the sandboxed process is attempting a sandbox bypass attack.

16. The system of claim 15, wherein the high privileged process was created by the sandboxed process if the resource folder was created by a broker process in response to a request by the sandboxed process.

* * * * *

UNITED STATES PATENT AND TRADEMARK OFFICE
CERTIFICATE OF CORRECTION

PATENT NO. : 10,574,672 B2
APPLICATION NO. : 15/200983
DATED : February 25, 2020
INVENTOR(S) : Xiaoning Li et al.

Page 1 of 1

It is certified that error appears in the above-identified patent and that said Letters Patent is hereby corrected as shown below:

In the Claims

In Column 15, Line 13, in Claim 5, delete "claim 1" and insert -- claim 4 --, therefor.

Signed and Sealed this
Second Day of June, 2020

Andrei Iancu
*Director of the United States Patent and Trademark Office*